Figure 1:
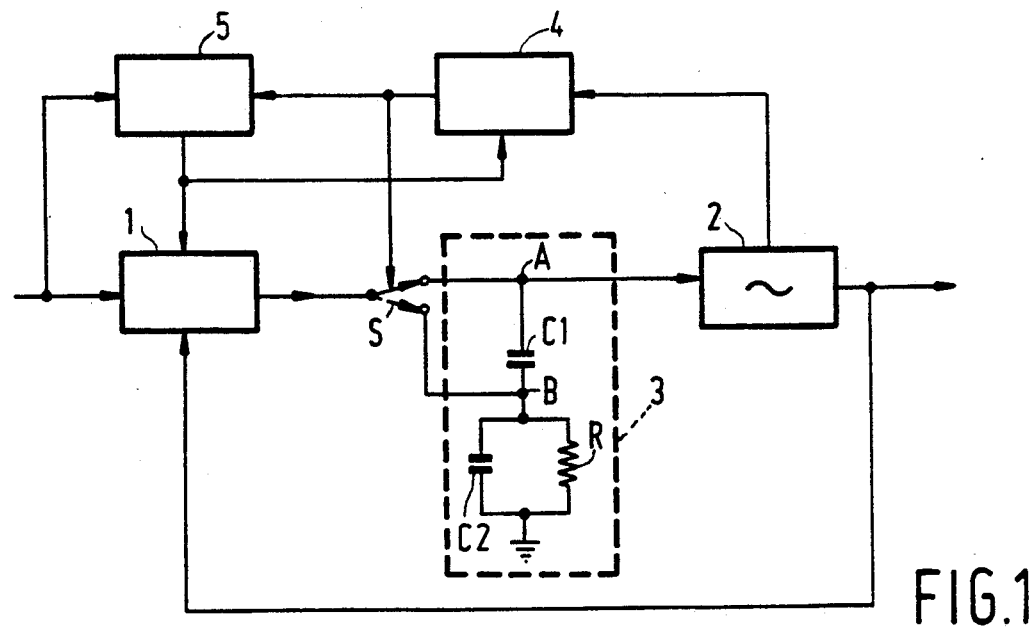

United States Patent [19]

Heerkens

[11] Patent Number: 5,113,257
[45] Date of Patent: May 12, 1992

[54] LINE SYNCHRONISING CIRCUIT

[75] Inventor: Henricus J. Heerkens, Eindhoven, Netherlands

[73] Assignee: U.S. Philips Corporation, New York, N.Y.

[21] Appl. No.: 696,324

[22] Filed: Apr. 30, 1991

Related U.S. Application Data

[63] Continuation of Ser. No. 534,000, Jun. 5, 1990, abandoned, which is a continuation of Ser. No. 249,629, Sep. 26, 1988, abandoned.

[30] Foreign Application Priority Data

Oct. 26, 1987 [NL] Netherlands .................. 8702538

[51] Int. Cl.⁵ .............................................. H04N 5/05
[52] U.S. Cl. ................................. 358/158; 358/148
[58] Field of Search ............... 358/148, 158, 159, 19; 331/17, 20

[56] References Cited

U.S. PATENT DOCUMENTS

| | | | |
|---|---|---|---|
| 3,909,755 | 9/1975 | Anderson et al. | 331/17 |
| 4,122,488 | 10/1978 | Mikado | 358/158 |
| 4,214,260 | 7/1980 | van Straaten | 358/148 |
| 4,535,358 | 8/1985 | Duijkers | 358/158 |
| 4,574,307 | 3/1986 | Nillesen | 358/159 |
| 4,611,229 | 9/1986 | Srivastava et al. | 358/158 |
| 4,758,801 | 7/1988 | Draxelmayr | 331/17 |
| 4,992,872 | 2/1991 | Hartmann et al. | 358/148 |

FOREIGN PATENT DOCUMENTS

| | | | |
|---|---|---|---|
| 0140035 | 8/1982 | Japan | 358/158 |
| 0055769 | 4/1985 | Japan | 358/158 |
| 0224571 | 10/1986 | Japan | |
| 0269572 | 11/1987 | Japan | |

OTHER PUBLICATIONS

Josefsberg, Yekutiel, "Stable and Fast PLL Switches Loop Bandwidths", Electronics, 3/10/82, vol. 55, No. 5, p. 139.

*Primary Examiner*—James J. Groody
*Assistant Examiner*—David E. Harvey

[57] ABSTRACT

A line synchronising circuit in a picture display device comprises a phase discriminator, a loop filter and a line oscillator constituting a control loop for controlling the frequency and/or the phase of the oscillator signal. To reduce the phase error, which occurs after a phase jump in the incoming signal, and to reduce the time in which the error is visible, the loop filter has a first part for supplying a first control signal having a first response time and a second part for supplying a second control signal having a second response time which is shorter than the first response time, the two parts of the loop filter being coupled to the control input of the line oscillator, and means for coupling the two parts or the second part, respectively, of the loop filter to the output of the phase discriminator.

4 Claims, 3 Drawing Sheets

LINE SYNCHRONISING CIRCUIT

This is a continuation of application Ser. No. 07/534,000, filed June 5, 1990, now abandoned, which is a continuation of application Ser. No. 07/249,629, filed Sept. 26, 1988, now abandoned. The invention relates to a circuit for the line synchronisation in a picture display device, comprising a line oscillator, a phase discriminator having an input for receiving a signal generated by the oscillator, an input for receiving an incoming line synchronizing signal and an output, a loop filter for smoothing the signal at the output of the phase discriminator and for applying the obtained control signal to a control input of the line oscillator for controlling the frequency and/or the phase of the oscillator signal.

A circuit of this type is generally known for use in picture display devices, for example, television receivers. If for some reason or other a variation of the frequency and/or the phase of the oscillator signal with respect to the incoming line synchronizing signal occurs in this known circuit, the control loop constituted by means of the phase discriminator, the loop filter and the line oscillator ensures that the synchronism between the two signals is substantially restored in the course of time.

However, if the incoming video signal, from which the synchronizing signal applied to the line synchronizing circuit is derived, originates from a video recorder, a phase jump may occur in the series of the incoming line synchronizing pulses at the end of a field. It is a requirement that this jump, expressed in time, covers at most 16 μs i.e. a quarter of a line period. Known circuits do not completely correct the perturbation of the synchronizing circuit caused at the end of the field blanking interval, that is to say, before the part of the video signal to be displayed which is visible on a display screen begins, resulting in the phase of the line oscillator signal being incorrect at the beginning of the field for a number of line periods so that the picture is displayed on the screen in a distorted manner such that vertical lines at the top of the screen are crooked.

This error can be prevented by using known measures. For example, the picture display device may have a facility for an accelerated lock-in during the field blanking interval by switching the line phase control loop during this interval upon reception of video recorder signals, more specifically in such a manner that the loop gain of the loop in this interval acquires a higher value. or the time constant of the loop filter in the form of a low-pass filter is reduced. However, these and similar measures have the drawback that the behaviour of the control loop in the case of small phase errors is not optimum and that the circuit will be too sensitive to noise and interference.

It is an object of the invention to provide a circuit of the type described above which can handle a considerable phase deviation without taking special measures when receiving video recorder signals, and consequently also when the deviation is caused by other factors, and without any deterioration of the other properties of the circuit. To this end the circuit according to the invention is characterized in that the loop filter has a first part for supplying a first control signal having a first response time and a second part for supplying a second control signal having a second response time which is shorter than the first response time, the two parts of the loop filter. being coupled to the control input of the line oscillator, and means for coupling the two parts or the second part, respectively, of the loop filter to the output of the phase discriminator.

The invention is based on the recongnition that due to this measure the first control signal, ensuring the d.c. bias of the control loop because of its long response time, can be maintained small after the occurrence of a large phase jump so that the phase deviation caused by the phase jump remains small and has a short duration.

According to a further aspect of the invention, a line synchronizing circuit also comprising a keying signal generator cooupled to the line oscillator for generating a pulsatory keying signal derived from the oscillator signal in the case of a phase difference measured by the phase discriminator which difference is one or a predetermined number of successive times smaller than a predetermined value, the central instant of a keying pulse and the central instant of a line synchronizing pulse substantially coinciding in the synchronous state of the control loop constituted by the phase discriminator, the loop filter and the oscillator, is characterized in that the two parts of the loop filter are coupled to the output of the phase discriminator during the occurrence of the keying pulses and in that the second part of the filter is coupled to the output outside the occurrence of the keying pulses. In known circuits in which such keying pulses occur, for example, the synchronizing circuit described in U.S. Pat. No. 4,214,260, the operation of the entire control loop is keying by means of the keying pulses so as to improve the properties of the loop when signals beset with noise are received. In the present invention the parts of the loop filter are switched for improving the jump response of the loop without deteriorating the properties in the case of noise.

In a simple manner, the circuit according to the invention is characterized in that a switch controlled by the keying pulses connects the two parts of the loop filter to the output of the phase discriminator during the occurrence of said pulses and connects the second part of the filter to said output outside the occurrence of the keying pulses.

In a first embodiment the circuit is characterized in that the first part of the loop filter includes a voltage source and the second part includes a resistor, the two parts being arranged in series.

In a second embodiment the circuit is characterized in that the first part of the loop filter includes an intergrator arranged in series with the switch and the second part includes a storage element which is resettable before the occurrence of a keying pulse, an adder stage adding the information from the integrator and the information from the storage element for applying the information to the control input of the line oscillator.

Figure 2:
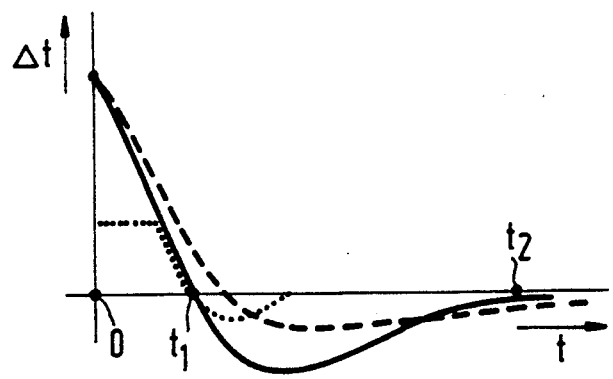
Figure 6:
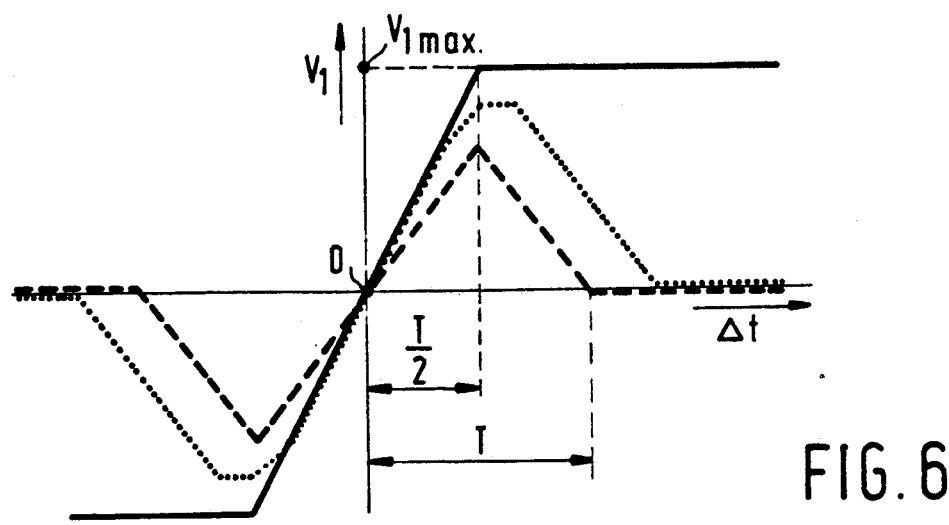
Figure 3:
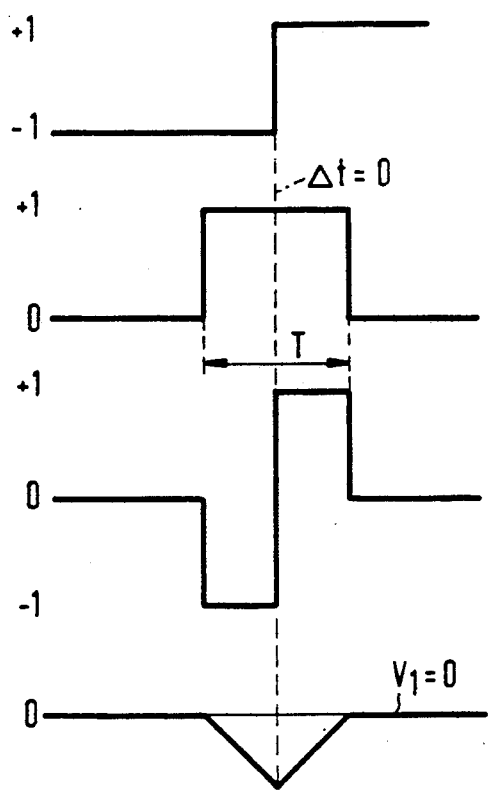
Figure 4:
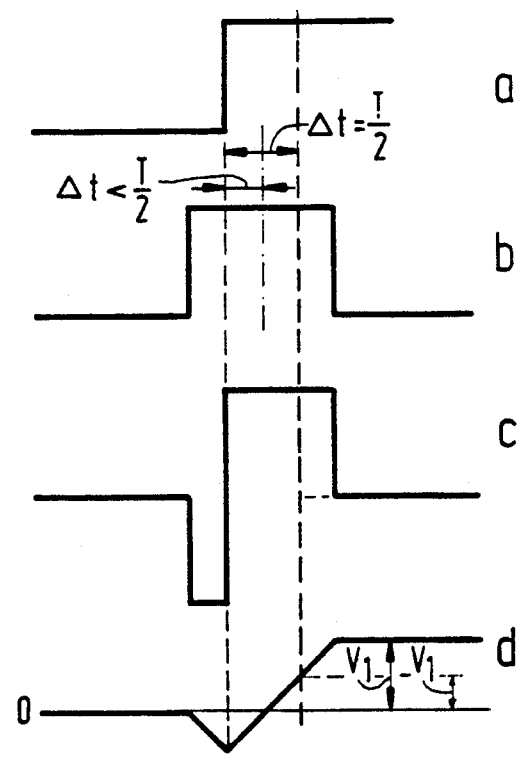
Figure 5:
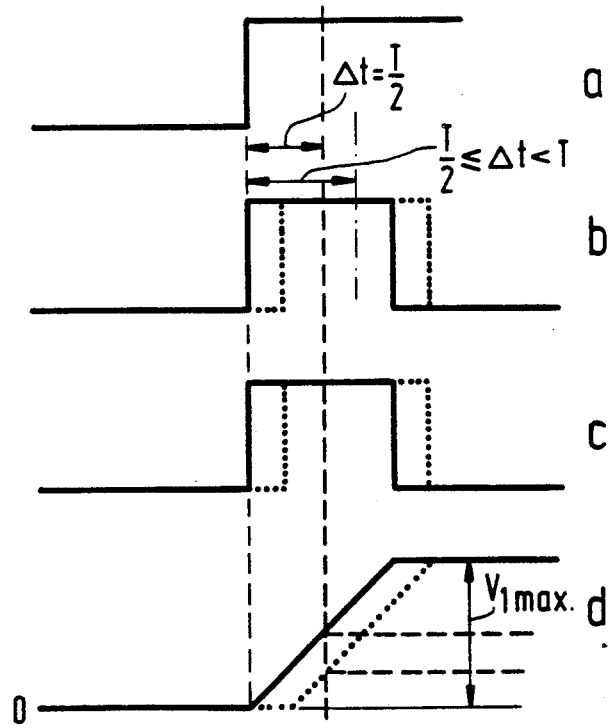
Figure 7:
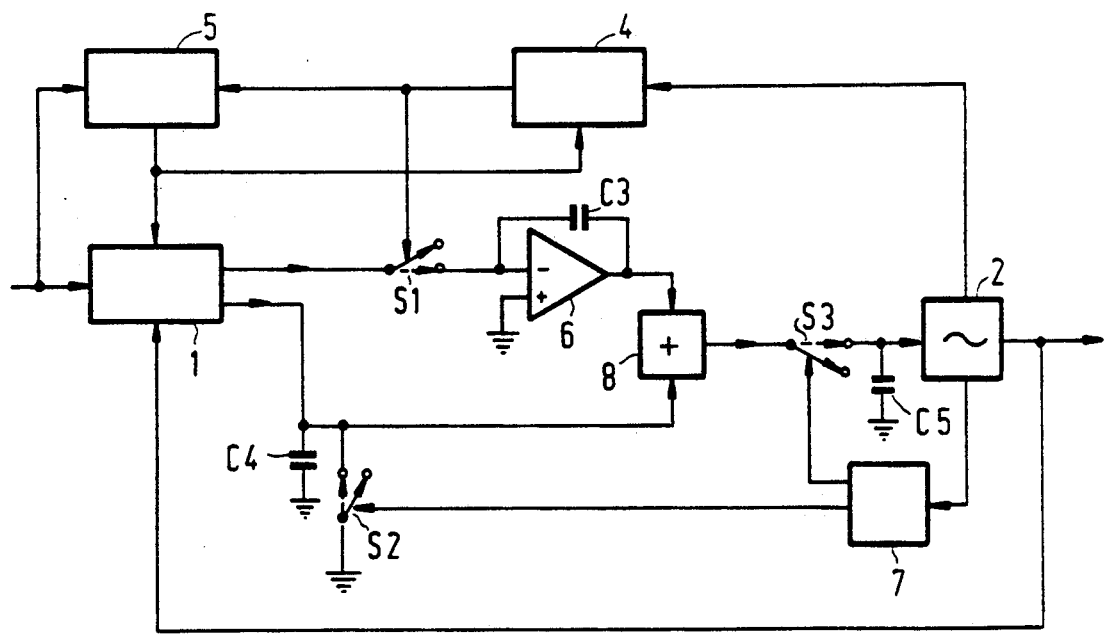
Figure 8:
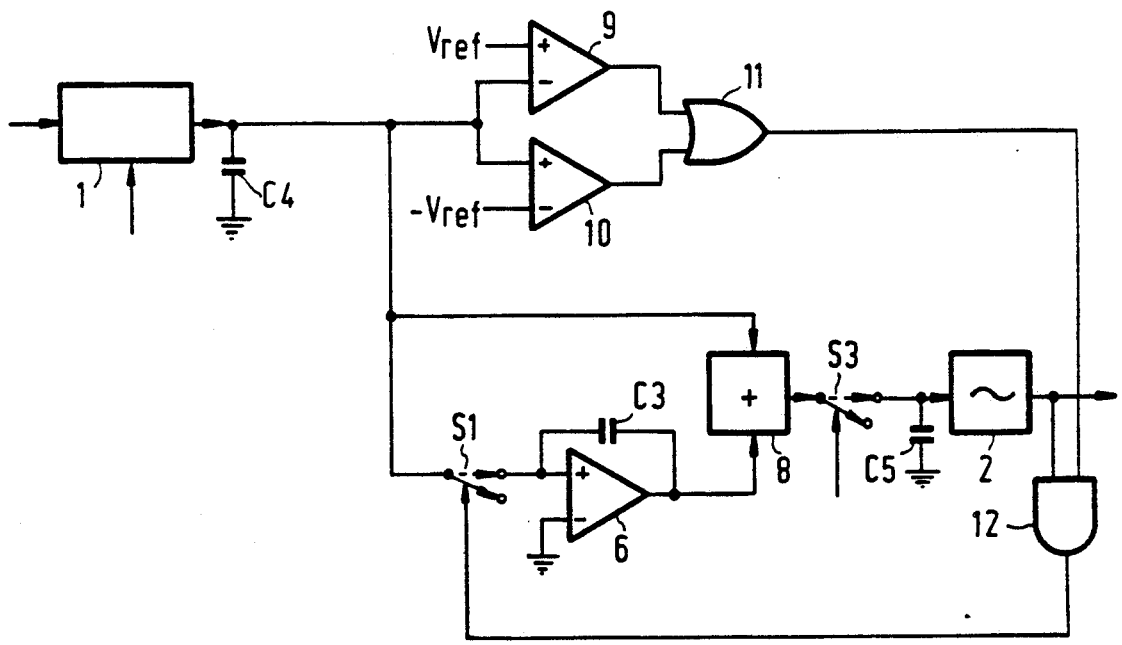

In a third embodiment the circuit according to the invention is advantageously characterized in that the two parts of the loop filter are coupled to the output of the phase discriminator in the case of a value of the phase difference measured by the phase discriminator which is lower than a predetermined value, the second part of the loop filter being coupled to the output in the case of a value which is higher than the predetermined value. The second and third embodiments may be equipped in a simple manner with digital means, which enhances the reliability of the circuit and provides the possibility of integrating it in an integrated circuit. The invention will now be described in greater detail, by way of example, with reference to the accompanying drawings in which FIG. 1 shows a first embodiment of the circuit according to the invention, FIG. 2 is a time diagram to explain the jump response, FIG. 3, 4 and 5 show the waveforms as a function of time of some signals in the circuit of FIG. 1 at different values of the phase deviation, FIG. 6 shows the variation of the first signal as a function of the phase deviation, FIG. 7 shows a second embodiment of the circuit according to the invention and FIG. 8 shows a third embodiment of the circuit according to the invention. In FIG. 1 the reference numeral 1 denotes a phase discriminator. A line synchronizing signal which is derived in known manner from an incoming video signal by means of a synchronizing signal separator is applied to a first input of this phase discriminator. A signal generated by a controllable line oscillator 2 is applied to a second input of discriminator 1. A signal which is a measure of the phase difference between the two input signals and which is then smoothed by a loop filter 3 is present at an output of discriminator 1. The smoothed signal is a control signal which is applied to a control input of oscillator 2 for controlling the frequency and/or the phase of the signal generated thereby. The oscillator signal is processed in known manner for obtaining a signal which is suitable for the line (horizontal) deflection in a picture display tube (not shown).

Elements 1, 2 and 3 constitute a phase control loop of a known type. In the synchronous state of this loop the signal of oscillator 2 has the same frequency and substantially the same phase as the line synchronizing signal. If the frequencies of the two signals are not equal, the signal at the output of discriminator 1 is an AC signal, and if the frequencies are equal while there is phase difference, this signal is a DC signal. Oscillator 2 is corrected in such a manner that the phase deviation becomes substantially zero in the course of time. For this purpose the loop filter 3 is formed as a low-pass filter. The different elements of the controls loop are chosen to be such that a compromise can be found between the contradictory requirements which are imposed on the circuit, namely the rapid lock-in in the case of lost synchronism and the insensitivity to noise nd interference. The circuit is improved in this respect by providing a keying signal generator 4 and a coincidence detector 5. Generator 4 is coupled to oscillator 2 and generates a pulsatory keying signal which is derived from the oscillator signal. The keying pulses have the same frequency and phase as the oscillator signal and in the synchronous state of the control loop the contral instant of a keying pulse, the central instant of a line synchronizing pulse and the instant of occurrence of an edge in the oscillator signal substantially coincide, the keying pulse in principle having the same duration as the synchronizing pulse. Detector 5 receives line synchronizing pulses and the keying pulses. If the pulses applied to the detector 5 at least partly coincide or, in other words, if the phase between these pulses in smaller than a predetermined value, and if this coincidence has taken place once or a predetermined number of successive times, the loop gain of the control loop is switched by means of detector 5, for example, because the sensitivity of discriminator 1 is switched between two values.

The foregoing is well known to those skilled in the art. A more detailed description has been given in U.S. Pat. No. 4,214,260 whose contents are herein incorporated by reference.

If the incoming video signal originates from a video recorder, a phase jump may occur at the end of a field in the series of the line synchronizing pulses applied to discriminator 1. This jump expressed in time, is at most 16 $\mu$s. In FIG. 2 a solid line denotes the response of a line phase control loop to a 16 $\mu$s jump, the time error $\Delta t$ of the oscillator being plotted as a function of time after the jump. It is apparent from this Figure that the error is initially reduced and becomes zero after a time $t_1$, whereafter an error occurs in the opposite direction. This errors reaches a maximum and becomes subsequently smaller. At an intstant $t_2$ the error has become negligibly small. In known circuits the time up to instant $t_2$ may be so long that before this instant a given number of visible lines is displayed in a distorted manner on the display screen of the display tube. For example, vertical straight lines are displayed crooked at the top of the screen. This phenomenon should not be confused with the phase error which may occur as a result of the fact that the synchronizing pulses during the field synchronising interval have a different duration than the line synchronizing pulses during the rest of the time so that distortion may also occur at the beginning of the field. This error can be eliminated in known manner because the phase discriminator in rendered inoperative during the field synchronizing and equalizing interval.

As a rule the loop filter is constituted by the parallel arrangement of a capacitor and the series network of a second capacitor and a resistor, through which parallel arrangement the output current of the phase discriminator flows. In FIG. 1 this filter is replaced by the filter shown in the Figure comprising a capacitor C1 in series with the parallel network of a second capacitor C2 and a resistor R and which is also connected to the said current. In a simple manner, the values of the elements of the filter of FIG. 1 can be derived from the values of the elements of the first-mentioned filter so as to maintain the same impedance and hence the same transfer function. If firstly the filter is considered without capacitor C2, it will be clear that the filter comprises a first part constituted by capacitor C1 for passing on a voltage $V_1$ which is equal to the integral with respect to time of the output current of the phase discriminator, and a second part constituted by resistor R for passing on a voltage $V_2$ which is proportional to the current. However, in practice the voltage across resistor R may have such a large value that the oscillator does not operate properly. For this reason it is favourable to smooth this voltage by means of capacitor C2. The first part of filter 3 can then be considered as an element, which is free from losses, for passing on voltage $V_1$ and the second part an be considered as an element, with losses, for passing on voltage $V_2$. The control voltage $V_o$ for the oscillator is the sum of these two voltages.

Filter 3 is dimensioned in such a way that the behaviour in the case of noise and the behaviour in the case of phase jumps are predominantly determined by the second part, with voltage $V_2$ following rapid changes. On the contrary, capacitor C1 has such a large capacitance, for example, 10 $\mu$f that variations in the voltage across this capacitor are very slow. Its major task is to ensure the d.c. bias of the control loop, that is to say, to adapt the frequency of the oscillator to the line frequency of the incoming signal, and it could be replaced by a voltage source without affecting the operation of the loop, but with the exception of the behaviour in the case of deviating line frequencies at which a static error would be introduced. For the sake of simplicity it may be assumed that voltage $V_o$ is zero and that consequently voltages $V_1$ and $V_2$ are also zero in the nominal case when the line frequency of the incoming signal has the nominal value, i.e. for example 15.625 kHz for the European television standard, and when the line oscillator has the same frequency whilst the phase deviation between the two signals is zero. The product of the value of resistor R, for example 820 Ω, and the capacitance of capacitor C2, for or example 100 nF is chosen to be such that the voltage across capacitor C2 and resistor R has become low after one linee period. In the given structure of the filter the two functions, namely generating voltage $V_1$ with a long response time and generating voltage $V_2$ with a short response time are separated.

After the instant $t_1$ at which the curve of FIG. 2 crosses the zero axis for the first time, the further variation of the jump response is determined by the values of voltages $V_1$ and $V_2$ at instant $t_1$. If in the first instance capacitor C1 is considered as an integrator which is free from losses, the input impedance of the line oscillator being assumed to be very large, it must hold that the sum of all phase errors meansured by phase discriminator 1 and viewed over the entire jump response, i.e. up to instant $t_2$ is zero. In fact, the phase error was zero before the perturbation and is substantially zero at instant $t_2$. In FIG. 2 the response of the control loop is denoted by a broken line for a larger capacitance of capacitor C1, thus for a smaller value of voltage $V_1$ at instant $t_1$ than for the case of the solid-line curve. It is true that the maximum error occurring after instant $t_1$ is then smaller, but it is apparent from the foregoing that instant $t_2$ is moved to the right in FIG. 2, that is to say, the error remains visible for a longer time. The invention is based on the recongnition that the value of voltage $V_1$ at the instant $t_1$ can be made smaller so as to improve the response, whilst the sum of all phase errors measured by the discriminator before instant $t_1$ is zero without having to increase the capacitance of capacitor C1.

FIG. 3 shows some waveforms, namely the oscillator signal in a, the line synchronizing pulse in b and the output signal of discriminator 1, for example, a current, in c. FIG. 3 holds for the case when there is no phase error between the two input signals of the discriminator. The signal of FIG. 3a alternately has two levels denoted by −1 and +1, respectively, the signal of FIG. 3b has the levels 0 and +1, respectively, and the signal of FIG. 3c is the result of the multiplication of the other two signals. FIG. 3d shows voltage $V_1$ as the result of the integration of the signal of FIG. 3c. It is apparent from these time diagrams that voltage $V_1$ is zero before and after a perturbation caused by the synchronizing pulse. Similarly, FIG. 4 shows corresponding waveforms a, b, c and d in the case of a phase error at which the central instant of the synchronizing pulse occurs later than the instant of occurrence of the edge of the oscillator signal. It is apparent from FIG. 4 that voltage $V_1$ assumes a positive value after the said perturbation. If the phase error has the value for which the interval between the instant of occurrence of the edge and the central instant of the synchronizing pulse is equal to or is longer than half the period T of the said pulse, it is apparent from FIG. 5 showing waveforms a, b, c and d corresponding to those of FIGS. 3 and 4, that voltage $V_1$ then has a given maximum value $V_{1max}$ which is not exceeded if the time deviation is longer than T/2. The last-mentioned case is shown by means of a dotted line in FIG. 5.

With reference to FIGS. 3, 4 and 5, the value of voltage $V_1$ is plotted as a function of the time deviation in FIG. 6 in which $V_1$ is zero if the deviation Δ is zero. In the case of a deviation between 0 and T/2, voltage $V_1$ is a linear function of Δt and for $\Delta t \geq T/2$ voltage $V_1$ has the value $V_{1max}$. If the central instant of the line synchronizing pulse occurs earlier than the instant of occurrence of the edge of the oscillator signal, voltage $V_1$ is negative. The characteristic curve of FIG. 6 is thus symmetrical with respect to the origin of the system of axes. The value of $V_1$ at instant $t_1$ corresponds to the sum of all previous phase errors measured by phase discriminator 1. Since this discriminator cannot measure a time deviation which is longer than T/2 according to FIG. 6, the increase of voltage $V_1$ will be constant during a number of lines until the control loop reaches the linear range of FIG. 6 due to the phase change of the oscillator signal which has occurred in this period. This is effected at a rate which is predominantly determined by voltage $V_2$.

In FIGS. 4 and 5 the broken line denotes the case in which phase discriminator 1 is only operative during the occurrence of the keying pulses of generator 4, the duration of the keying pulses being assumed to be equal to the period T, i.e. for example, approximately 4.7 μs in accordance with the European television standard. This means that discriminator 1 is operative only during a time T/2 after the edge of the oscillator signal. It is apparent from FIGS. 4 and 5 that voltage $V_1$ is lower than when discriminator 1 is operative during the entire line period, and that voltage $V_1$ decreases linearly after having reached the maximum for $\Delta t = T/2$. For $\Delta t \geq T$ voltage $V_1$ is zero. The characteristic curve obtained, which is symmetrical with respect to the origin, is also denoted by broken lines in FIG. 6. In such a characteristic curve voltage $V_1$ is much lower at instant $t_1$ than in the case when the phase discriminator is not keyed so that the jump response is improved considerably. This, however, should only apply to the part of the loop filter with voltage $V_1$ and not to the part with voltage $V_2$, or else the control loop does not react to time deviations which are larger than T or which are smaller than −T. Thus it should be ensured that the control loop for $\Delta t > T$ and $\Delta t < -T$ does not contribute to $V_1$, but does contribute to $V_2$.

FIG. 1 indicates in which way the conditions mentioned hereinbefore can be satisfied. The circuit includes a selection switch S whose master contact is connected to the output of phase discriminator 1, whilst one of the selection contacts is connected to the control input of oscillator 2 and to the terminal A of capacitor C1 remote from elements C2 and R, and the other selection contact is connected to the junction point B of elements C1, C2 and R. Switch S is controlled by the keying pulses in such a way that it connects point A to the output of discriminator 1 during the occurrence of the keying pulses and connects point B to said output outside the occurrence of these pulses. During the occurrence of the keying pulses the output current of the discriminator flows through the entire filter and outside the occurrence of these pulses the current only flows through the second part of filter 3 constituted by elements R and C2. At the change-over instants the control voltage for oscillator 2 and hence the phase of the oscillator varies to a very small extent, because the voltage across capacitor C1 has remained substantially unchanged in the previous time interval. It is apparent therefrom that due to the change-over the value of voltage $V_1$ at instant $t_1$ is reduced considerably because the first part of the filter is not used as long as the control loop operates in the nonlinear range, whereas voltage $V_2$ is substantially not affected because the said current always flows through the second part of the filter. The behaviour of the control loop in the case of small phase errors and noise is not changed with respect to the situation in which no change-over of the filter is effected, because capacitor C1 hardly influences this. The variation of voltage $V_2$ is passed on to oscillator 2 by way of the capacitor.

It will be evident that the keying pulse should be as short as possible, for then voltage $V_1$ at instant $t_1$ is lower, but it will also be evident that this pulse should not be shorter than the line synchronizing pulse, because otherwise a so-called dead zone would be produced in the characteristic curve and in practice the keying pulse will be slightly longer than the synchronizing pulse, for example, approximately 5 μs as compared with 4.7 μs. Therefore the characteristic curve shown in FIG. 6 undergoes a small change. The characteristic curve obtained is shown in a dotted line in the Figure: particularly, voltage $V_1$ has a positive value in the case of a time deviation of T and $V_1$ is zero for a value which is slightly higher than T. Consequently, the jump response will hardly get worse. However, with the circuit described the behaviour of the control loop during lock-in is not satisfactory. This is improved because outside coincidence the keying pulse generator 4 is rendered inoperative by means of coincidence detector 5 so that the output of discriminator 1 always remains connected to point A, whilst the loop gain of the control loop has its highest value, for example, because the output current of discriminator 1 acquires a higher value.

A reduction of the maximum phase error after a large phase jump and a considerably shorter period of time between instants O and $t_2$ is obtained with the circuit of FIG. 1, the error after the phase jump at instant O having at most the value corresponding to the period T/2. This is indicated by means of a dotted line in FIG. 2.

The circuit may be formed in a different manner, for example, as is shown in FIG. 7. In FIG. 7 the same elements as those in FIG. 1 have the same reference symbols. A first output current of discriminator 1 is applied via a switch S1, which is closed during the occurrence of the keying pulses, to an integrator comprising an amplifier 6 and a capacitor C3. A second output current of discriminator 1 is applied to a capacitor C4. A buffer stage, for example a current mirror is incorporated between the two output currents of discriminator 1. A switch S2 is arranged parallel to capacitor C4. An input of amplifier 6 is connected to ground and an output conveys voltage $V_1$. A pulse generator 7 generating line frequency pulses is coupled to oscillator 2. One of these pulses occurs before a keying pulse and closes switch S2. In this way a voltage is produced across this capacitor C4 during each line, which voltage is proportional to the difference between the time in which the output current of discriminator 1 flows in a given direction and the time in which this current flows in the opposite direction and which becomes subsequently zero before a new measurement. This is the previously mentioned voltage $V_2$. The voltages $V_1$ and $V_2$ are applied to an adder stage 8. An output of this stage is connected to a sampling circuit comprising a switch S3 and a capacitor C5, switch S3 being operated by a pulse from generator 7 and this in such a manner that the voltage at the output of stage 8 is applied to capacitor C5 each time after the occurrence of the keying pulse and hence is applied as a control voltage to oscillator 2. The control voltage is preserved after a sampling pulse by means of the sampling circuit in spite of the fact that the arrangement for generating voltage $V_2$ is reset each time.

FIG. 8 shows a part of another modification of the synchronizing circuit according to the invention in which the same elements as those in FIG. 7 have the same reference symbols. In this circuit the output current of discriminator 1 is applied to capacitor C4 and the voltage which is present across capacitor C4 is compared with a first reference voltage $+V_{ref}$ by means of a first comparison stage 9 and with a second reference voltage $-V_{ref}$ by means of a second comparison stage 10. An output of stage 9 is connected to one input of a gate 11 having an OR function and an output of stage 10 is connected to another input of gate 11. An output of gate 11 conveys a signal indicating whether the absolute value of the voltage across capacitor C4 is lower or higher than $V_{ref}$ and consequently whether a phase error occurs whose absolute value is smaller or larger than a predetermined maximum value. This signal is applied to an input of a gate 12 having an AND function. The voltage across capacitor C4 is also applied to adder stage 8 and to the series arrangement of switch S1 and integrator 6, C3. The output voltage of the integrator is applied to stage 8 whose output is connected to the sampling circuit S3, C5. The voltage across capacitor C5 is the control voltage for oscillator 2. The oscillator signal is applied to a second input of gate 12. In FIG. 8 switch S3 is closed after the occurrence of the line synchronizing pulse. In FIG. 8 switch S1 is controlled by gate 12 in such a way that the switch remains open if the phase error is larger than the maximum value and is closed in the opposite case, in which latter case the part of the control voltage having the long response time is present at the output of amplifier 6. The switch S2 of FIG. 7 is not necessary in FIG. 8 because capacitor C4 is discharge by means of integrator 6, C3 when switch S1 is closed. It will be seen that the circuit of FIG. 8 has a characteristic curve which has a linear waveform between the value of Δt corresponding to $-V_{ref}$ and the value of Δt corresponding to $+V_{ref}$, and which is zero for values outside this interval.

An advantage of the circuits of FIGS. 7 and 8 is that their elements can be replaced in a simple manner by digital means. For example, capacitor C4 may be replaced by a resettable storage element, for example, a counter storing the output information of the phase discriminator. A drawback of the embodiment of FIG. 1 may be that an integrated circuit comprising the majority of elements of the synchronizing circuit must have two connections for the loop filter instead of one, as in the prior art. This drawback is eliminated if the loop filter itself is integrated, which is possible if it is formed with switched capacitors.

What is claimed is:

1. A circuit for the line synchronization in a picture display device, comprising a line oscillator having a control input, a phase discriminator having an output and two inputs, one input for receiving a signal generated by the line oscillator and the other input for receiving an incoming line synchronizing signal, a loop filter for smoothing the signal at the output of the phase discriminator to obtain a control signal, said control signal being applied to the control input of the line oscillator for controlling the frequency and/or the phase of the signal generated by said line oscillator, wherein the loop filter has a first part for supplying a first control signal having a first response time and a second part for supplying a second control signal having a second response time which is shorter than the first response time, both parts of the loop filter being coupled to the control input of the line oscillator and switching means for alternately coupling the output of the phase discriminator to the control input of said line oscillator or to a node between the first and second parts of said loop filter.

2. A line synchronizing circuit as claimed in claim 1 wherein said line synchronizing signal comprises a series of pulses, said circuit also comprising a keying signal generator coupled to the line oscillator for generating a pulsatory keying signal derived from the line oscillator signal in response to a phase difference measured by the phase discriminator, which difference is less than a predetermined value, the central instant of a keying pulse and the central instant of a pulse of said line synchronizing signal substantially coinciding in the synchronous state of the control loop constituted by the phase discriminator, the loop filter and the line oscillator, and wherein the output of the phase discriminator is coupled to the control input of said line oscillator during the occurrence of the keying pulses and otherwise to said node.

3. A line synchronizing circuit as claimed in claim 2, wherein the first part of the loop filter includes a voltage source and the second part includes a resistor, the two parts being arranged in series.

4. A line synchronizing circuit as claimed in claim 3, wherein the voltage source is formed by means of a first capacitor, a second capacitor whose capacitance is many times smaller than the capacitance of the first capacitor being arranged parallel to the resistor.

* * * * *